United States Patent [19]
Ohlson et al.

[11] Patent Number: 6,075,781
[45] Date of Patent: Jun. 13, 2000

[54] FLUX DENSITY REDUCTION IN OCDMA SATELLITE COMMUNICATION SYSTEM

[75] Inventors: John Ohlson, Mt. View, Calif.; Francis D. Natali, Pt. Townsend, Va.

[73] Assignee: Stanford Telecommunications, Inc., Sunnyvale, Calif.

[21] Appl. No.: 09/080,952

[22] Filed: May 19, 1998

Related U.S. Application Data

[63] Continuation-in-part of application No. 08/989,466, Dec. 12, 1997.

[51] Int. Cl.[7] .................................................. H04B 7/216
[52] U.S. Cl. ........................................... 370/342; 370/208
[58] Field of Search ................... 370/203, 208, 370/206, 209, 210, 320, 342, 485; 455/13–4

[56] References Cited

U.S. PATENT DOCUMENTS

| | | | |
|---|---|---|---|
| 5,473,601 | 12/1995 | Rosen et al. | 370/50 |
| 5,594,941 | 1/1997 | Dent | 455/13.4 |
| 5,623,487 | 4/1997 | Natali | 370/342 |
| 5,638,361 | 6/1997 | Ohlson et al. | 370/342 |
| 5,687,166 | 11/1997 | Natali et al. | 370/209 |
| 5,764,630 | 6/1998 | Natali et al. | 370/320 |
| 5,848,060 | 12/1998 | Dent | 370/281 |

*Primary Examiner*—Hassan Kizou
*Assistant Examiner*—Duc Ho
*Attorney, Agent, or Firm*—Jim Zegeer

[57] ABSTRACT

A spread spectrum CDMA communication system in which base stations communicate with a plurality of subscriber terminals located in different beams of a multi-beam satellite relay system. A base station transmits a signal for each beam which is comprised of a set of orthogonally spaced subcarriers, each of which is modulated by a set of orthogonal functions which are overlaid with a pseudo-noise (PN) sequence forming a coded spreading sequence for an information signal. Each orthogonal function carries data for a single user in the beam. Selected carrier signals are modulated with information signals onto the subcarriers to form a beam signal. The available frequency spectrum is divided into non-overlapping segments which are assigned to different beams in a $1:N_{ru}$ frequency reuse pattern. Each subscriber terminal has a receiver which coherently demodulate the base station signal. A PN spreading code, P2, with chipping rate $N_{ru} \chi R_c$ is applied to all of the beam signals simultaneously to spread the signal energy over a wider bandwidth to reduce the power spectral density in each beam. The receiver correlates the received signal with a synchronized replica of P2 to remove P2 from the incoming signal without affecting beam-to-beam frequency isolation. The subcarriers of the beam signal are orthogonally spaced across the available frequency spectrum with spacing $N_{ru} \chi R_c$ and $N_{ru}$ distinct sets of subcarriers frequencies are formed to be assigned in the $1:N_{ru}$ beam frequency reuse pattern.

12 Claims, 6 Drawing Sheets

FLUX DENSITY REDUCTION IN OCDMA SATELLITE COMMUNICATION SYSTEM

REFERENCE TO RELATED APPLICATION

This application is a continuation-in-part application of our copending parent application Ser. No. 08/989,466 filed Dec. 12, 1997.

BACKGROUND AND BRIEF DESCRIPTION OF PRIOR ART

A number of consortiums have been formed to develop satellite based Personal Communications Systems (PCS) with global coverage. These systems include Globalstar (Globalstar System Application before the FCC by Loral Cellular Systems, Corp., Jun. 3, 1991), Odyssey (Application of TRW Inc. before the FCC to Construct a New Communications Satellite System "Odyssey," May 31, 1991), Ellipso (filed November, 1990), and ECCO (filed by Constellation Communications Inc. in June, 1991), among others. All of these systems employ multibeam antennas which provide isolation between geographical areas, thus allowing spectrum reuse.

The intent of these systems is that a subscriber can place telephone calls directly through the satellite network from almost anywhere on the Earth, using a portable handset much like the present cellular telephones. These systems also include mobile and fixed user terminals. All of the systems mentioned are required to use spread spectrum CDMA techniques for bandsharing purposes.

In 1990, Gilhousen et al published the paper "Increased Capacity Using CDMA for Mobile Satellite Communication"(*IEEE Journal on Selected Areas in Communications,* May 1990) which showed that system capacity is increased in a multibeam satellite system by using CDMA with a frequency reuse factor of one (i.e. the total frequency band is reused in each beam) compared to orthogonal systems such as FDMA or TDMA, which would typically employ a frequency reuse of 1:3 or 1:5, depending on the amount of isolation between beams.

The use of "marginal isolation" to provide full frequency reuse in quasi-orthogonal (nonsynchronous) CDMA system is suggested in U.S. Pat. No. 4,901,307 by Gilhousen, Jacobs and weaver (Feb. 13, 1990).

The Globalstar application discloses a signal which is essentially the same as the IS-95 terrestrial cellular standard. This system uses Orthogonal CDMA (OCDMA) on the forward (base-to-mobile) links and nonsynchronous CDMA on the return links. However, no distinction is made between the OCDMA forward link and the nonorthogonal CDMA return link in frequency reuse. Full frequency reuse is employed in each beam on both forward and return links, and this is assumed to be the best choice.

The basic signal format for OCDMA is disclosed by M. J. E. Golay in IDA Report 108, page 110 (1965). The system described is orthogonal in both the forward and return link directions.

OCDMA forward and return links are being considered for satellite PCS systems. Related patents which disclose improvements include U.S. Pat. No. 5,375,140 to Natali, and titled "Doubly Orthogonal Code and Frequency Division Multiple Access Communication System," and U.S. Pat. No. 5,668,795 to Magill et al and titled "Modulation System for Spread Spectrum CDMA Communication, incorporated herein by reference.

The capacity of a synchronous OCDMA system can be increased, under certain conditions, by employing a frequency reuse factor other than one and taking advantage of the orthogonal properties of the multiple access codes within a beam as disclosed in our patent application Ser. No. 08/989,466 filed Dec. 12, 1997 and entitled "Increased Capacity in an OCDMA System by Frequency Isolation". For example, the total capacity of the OCDMA system may be increased by employing 1:3 frequency reuse rather than full frequency reuse in every beam. In this case, frequency isolation is more important than additional spectrum to maximize capacity, even though full frequency reuse is possible.

Typically, for 1:3 frequency reuse, the available spectrum would be split into 3 subbands, which are assigned to the beams in a 3-frequency reuse pattern. Unfortunately, for the same forward link power, the power flux density from the satellite has now tripled in the one-third of the band used. This is disadvantageous since, in many cases, the system capacity becomes limited by the FCC/CTI limitation on maximum power flux density of the satellite forward link signal incident on the Earth's surface. It also changes the band sharing scenario, since the signal now takes up only ⅓ of the available spectrum in each beam, but is potentially 5 dB stronger.

OBJECTS OF THE INVENTION

The object of this invention is to allow the capacity increase in a synchronous OCDMA system gained by employing a frequency reuse factor other than one, as disclosed in our U.S. patent application Ser. No. 08/989,466 for "Increased Capacity in an OCDMA System by Frequency Isolation", without increasing the power flux density of the satellite forward link signal.

Another object of this invention is to allow the capacity increase in a synchronous OCDMA system gained by employing a frequency reuse factor other than one, and still allow the signal power to be spread uniformly across the available spectrum for band sharing purposes.

FEATURES OF THE INVENTION

A.

A spread spectrum CDMA communication system in which one or more base stations communicate with a multiplicity of subscriber terminals located in different beams of a multi-beam satellite relay system, the base station(s) transmits a signal for each beam which is comprised of a set of orthogonally spaced subcarriers, each of which is modulated by a set of orthogonal, or nearly orthogonal, functions which are overlaid with a pseudo-noise (PN) sequence forming a coded spreading sequence for an information signal, each orthogonal function of said set carriers data for a single user in said beam, a source of selected carrier signals and means to modulate said information signals onto said subcarriers to form a beam signal and said coded spreading sequence on said beam signal. The available frequency spectrum is divided into nonoverlapping or orthogonal frequency segments which are assigned to different beams in a $1:N_{ru}$ frequency reuse pattern. Each subscriber terminal has a receiver with means to coherently demodulate the base station signal. The improvement comprising:

A PN spreading code, P2, with chipping rate $N_{ru} \chi R_c$ is applied to all of the beam signals simultaneously to spread the signal energy over a wider bandwidth in order to reduce the power spectral density in each beam.

A means in the receiver for correlating the received signal with a synchronized replica of P2 to remove P2 from the incoming signal without affecting beam-to-beam frequency isolation.

B.

The above system in which the subcarriers of the beam signal are orthogonally spaced across the available frequency spectrum with spacing $N_{ru}\chi R_c$ and $N_{ru}$ distinct sets of subcarrier frequencies are formed to be assigned in the 1:$N_{ru}$ beam frequency reuse pattern.

C.

The above system in which the data intended for each user is voice data.

D.

A spread spectrum CDMA satellite communication system, in which more than one satellite illuminates the same region on the earth, and one or more base stations communicate with a multiplicity of subscriber terminals located in different beams of the multi-beam satellite relay system, and the base station(s) transmits a signal for each beam which is comprised of a set of orthogonally spaced subcarriers, each of which is modulated by a set of orthogonal, or nearly orthogonal, functions which are overlaid with a pseudo-noise (PN) sequence forming a coded spreading sequence for an information signal, each orthogonal function of said set carries data for a single user in said beam, a source of selected carrier signals and means to modulate said information signals onto said subcarriers to form a beam signal and said coded spreading sequence on said beam signal. The available frequency spectrum is divided into non-overlapping or orthogonal frequency segments which are assigned to different beams in a 1:$N_{ru}$ frequency reuse pattern. Each subscriber terminal has a receiver with means to coherently demodulate the base station signal. The improvement comprising:

A PN spreading code, P3, with a chipping rate $N_{ru}\chi R_c$ is applied to all of the beam signals simultaneously to spread the signal energy over a wider bandwidth in order to reduce the power spectral density in each beam and reduce interference from neighboring satellites.

A means in the receiver for correlating the received signal with a synchronized replica of P2 to remove P2 from the incoming signal without affecting beam-to-beam frequency isolation.

E.

The above system in which the subcarriers of the beam signal are orthogonally spaced across the available frequency spectrum with spacing $N_{ru}\chi R_c$ and $N_{ru}$ distinct sets of subcarrier frequencies are formed to be assigned in the 1:$n_{ru}$ beam frequency reuse pattern.

F.

The above system in which the data intended for each user is voice data.

G.

A spread spectrum CDMA satellite communication system, in which another satellite communication system illuminates the same region on the earth, and one or more base stations communicate with a multiplicity of subscriber terminals located in different beams of the multi-beam satellite relay system, and the base station(s) transmits a signal for each beam which is comprised of a set of orthogonally spaced subcarriers, each of which is modulated by a set of orthogonal, or nearly orthogonal, functions which are overlaid with a pseudo-noise (PN) sequence forming a coded spreading sequence for an information signal, each orthogonal function of said set carries data for a single user in said beam, a source of selected carrier signals and means to modulate said information signals onto said subcarriers to form a beam signal and said coded spreading sequence on said beam signal. The available frequency spectrum is divided into non-overlapping or orthogonal frequency segments which are assignee to different beams in a 1:$N_{ru}$ frequency reuse pattern. Each subscriber terminal has a receiver with means to coherently demodulate the base station signal. The improvement comprising:

A PN spreading code, P2, with chipping rate $N_{ru}\chi R_c$ is applied to all of the beam signals simultaneously to spread the signal energy over a wider bandwidth in order to reduce the power spectral density in each beam.

A means in the receiver for correlating the received signal with a synchronized replica of P2, to remove P2 from the incoming signal without affecting beam-to-beam frequency isolation.

H.

The above system in which the subcarriers of the beam signal are orthogonally spaced across the available frequency spectrum with spacing $N_{ru}\chi R_c$ and $N_{ru}$ distinct sets of subcarrier frequencies are formed to be assigned in the 1:$N_{ru}$ beam frequency reuse pattern.

I.

The above system in which the data intended for each user is voice data.

J.

A spread spectrum CDMA satellite communication system, in which another satellite communication system illuminates the same region on the earth, and a multiplicity of subscriber terminals located in different beams of the multi-beam satellite relay system communicate with one or more base stations, and the subscriber terminals transmit a signal which is comprised of one of a set of orthogonally spaced subcarriers, which is modulated by one of a set of orthogonal, or nearly orthogonal, functions which are overlaid with a pseudo-noise (PN) sequence forming a coded spreading sequence for an information signal, the orthogonal function of said set carries data for transmission to the base station in said beam, a source of the selected subcarrier signal and means to modulate said information signal onto said subcarrier to form a return link signal and said coded spreading sequence on said return link signal. The available frequency spectrum is divided into non-overlapping or orthogonal frequency segments which are assigned to different beams in a 1:$N_{ru}$ frequency reuse pattern. Each base station has a receiver(s) with means to coherently demodulate the subscriber terminal signals. The improvement comprising:

A PN spreading code, P2, with chipping rate $N_{ru}\chi R_c$ is applied to the subscriber terminal transmit signal to spread the signal energy over a wider bandwidth in order to reduce the transmit power spectral density.

A means in the base station receiver for correlating the received signal with a synchronized replica of P4 to remove P2 from the incoming signal without affecting beam-to-beam frequency isolation.

K.

The above system in which the subcarriers in a beam are orthogonally spaced across the available frequency spectrum with spacing $N_{ru}\chi R_c$ and $N_{ru}$ distinct sets of subcarrier frequencies are formed to be assigned in the $1:N_{ru}$ beam frequency reuse pattern.

L.

The above system in which the data intended for each user is voice data.

DESCRIPTION OF THE DRAWINGS

The above and other objectives, advantages and features of the invention will become now apparent when considered with the following description and accompanying drawings wherein.

DETAILED DESCRIPTION OF THE INVENTION

Figure 1:
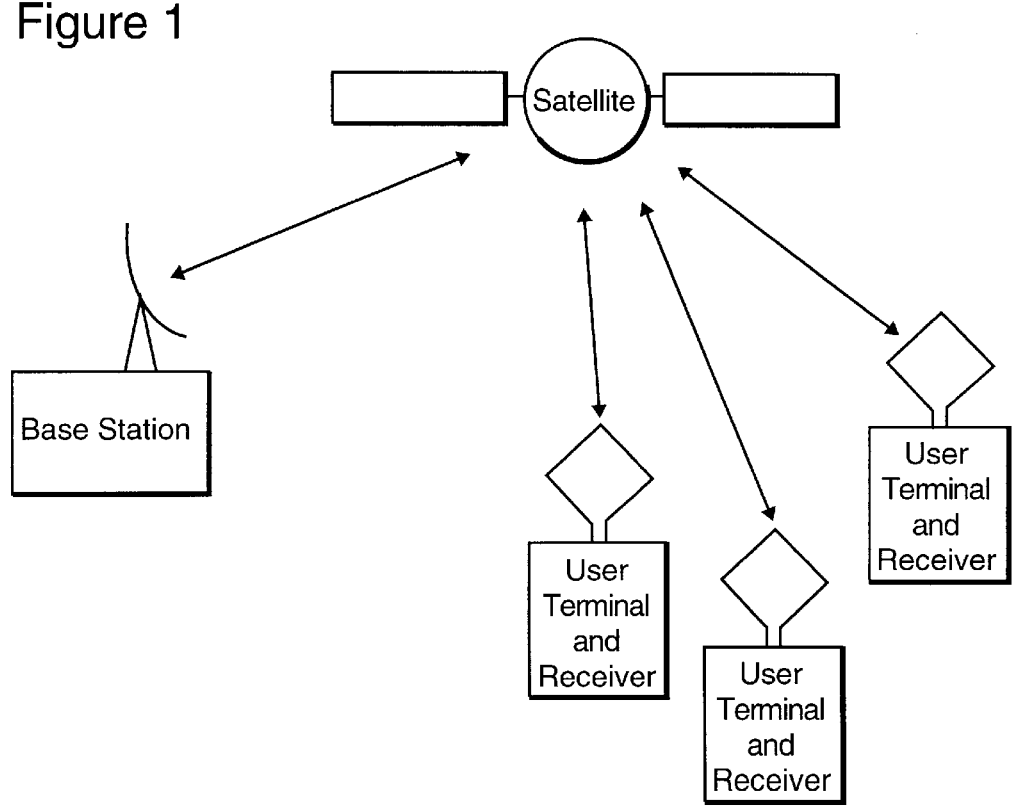
FIG. 1 is a schematic illustration of a satellite based OCDMA communication system incorporating the invention.

The invention is intended for a satellite communication system in which the satellite transmits an OCDMA signal which provides the Forward Link (FL) to communicate with a multiplicity of user terminals as shown in FIG. 1. The satellite signal may be relayed from a base station, or it may be generated on the satellite.

Figure 2:
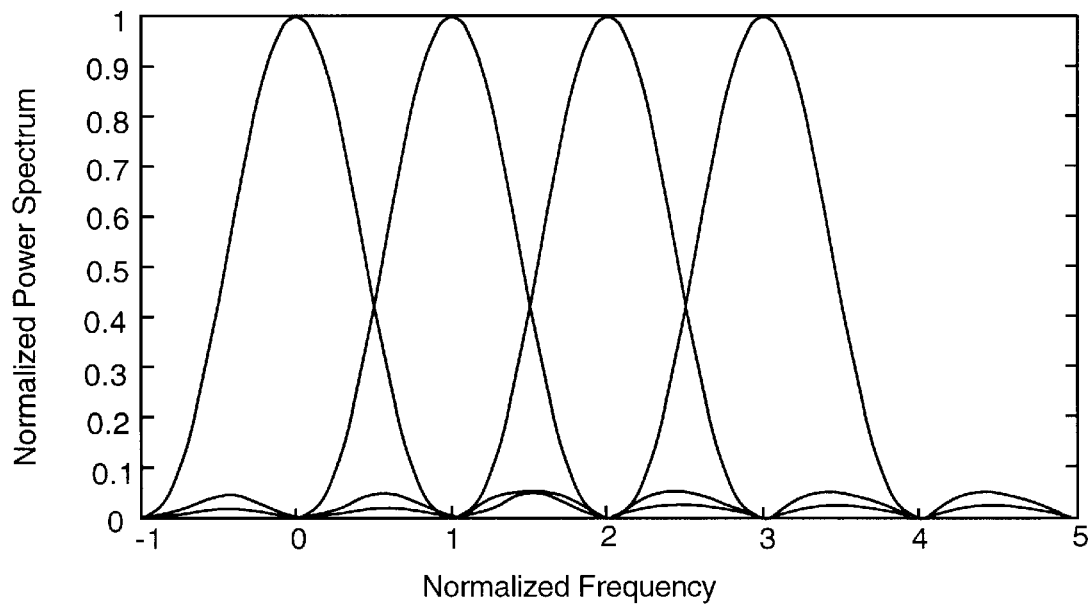
FIG. 2 is a graph illustrating four orthogonal subcarriers spaced at the chipping rate.
Figure 3:
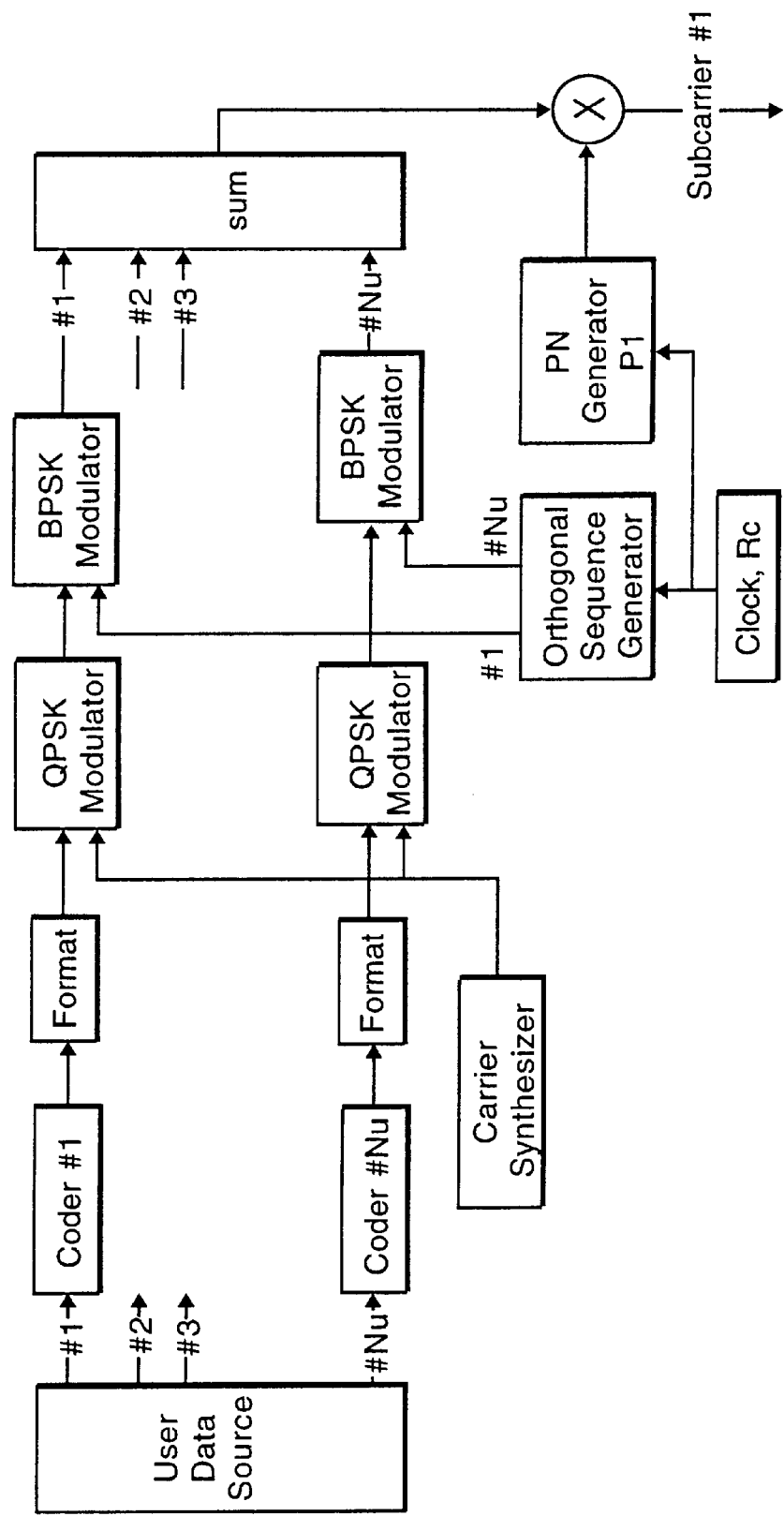
FIG. 3 is a functional block diagram of OCDMA subcarrier generation.

The FL OCDMA signal preferably incorporates the improvements of Natali U.S. Pat. No. 5,623,487 titled "Doubly orthogonal Code and Frequency Division Multiple Access Communication System," in which multiple carriers (called "subcarriers") are orthogonally spaced in frequency at the OCDMA code chip rate, Rc, as shown in FIG. 2. Each subcarrier is modulated with up to Nu orthogonal binary sequences, each carrying different data. Typically, each orthogonal function carries the data for a different user, however multiple functions may be assigned to a single high rate user. The orthogonal codes are overlaid with a longer PN code, $P_1$, which is common to all the users within a beam. Different beams may use different PN codes or time shifted versions of the same code if desired. In order to maintain orthogonality, the orthogonal signals must arrive at the receiver in time synchronism (this is a trivial requirement on the FL, since all signals originate at the same base station or at the satellite). The subcarrier signal generation process is shown in block diagram form in FIG. 3.

Figure 4:
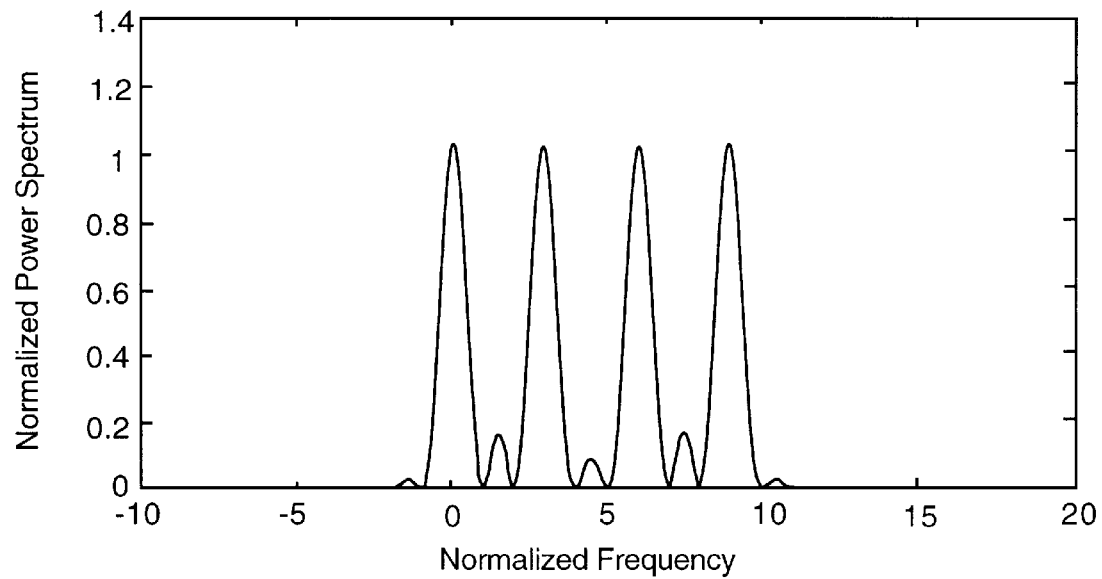
FIG. 4 is a graph illustrating subcarriers spaced by 3*Rc across available spectrum.
Figure 5:
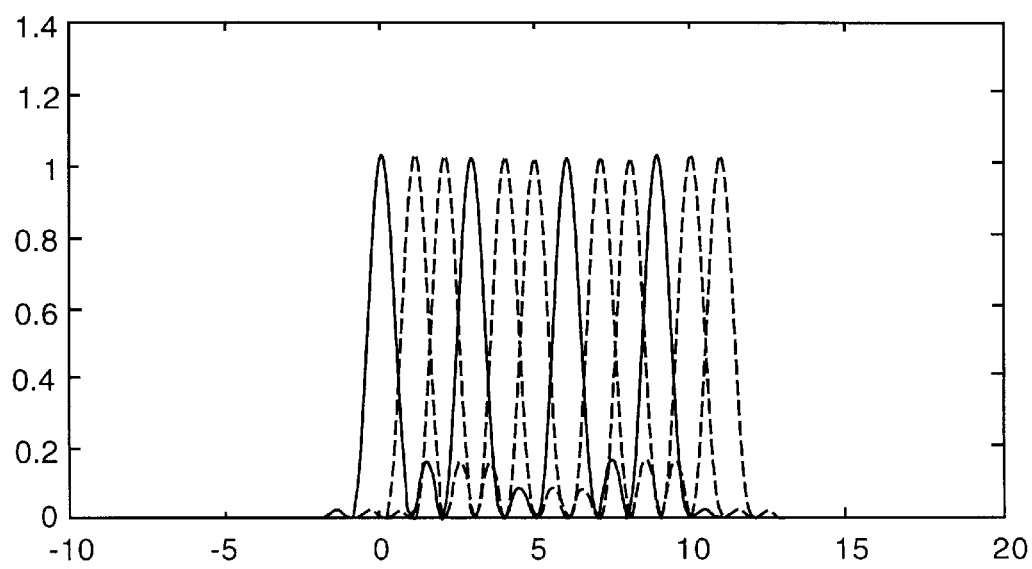
FIG. 5 is a graph illustrating three sets of subcarriers assigned to mutually orthogonal slots in different beams.
Figure 6:
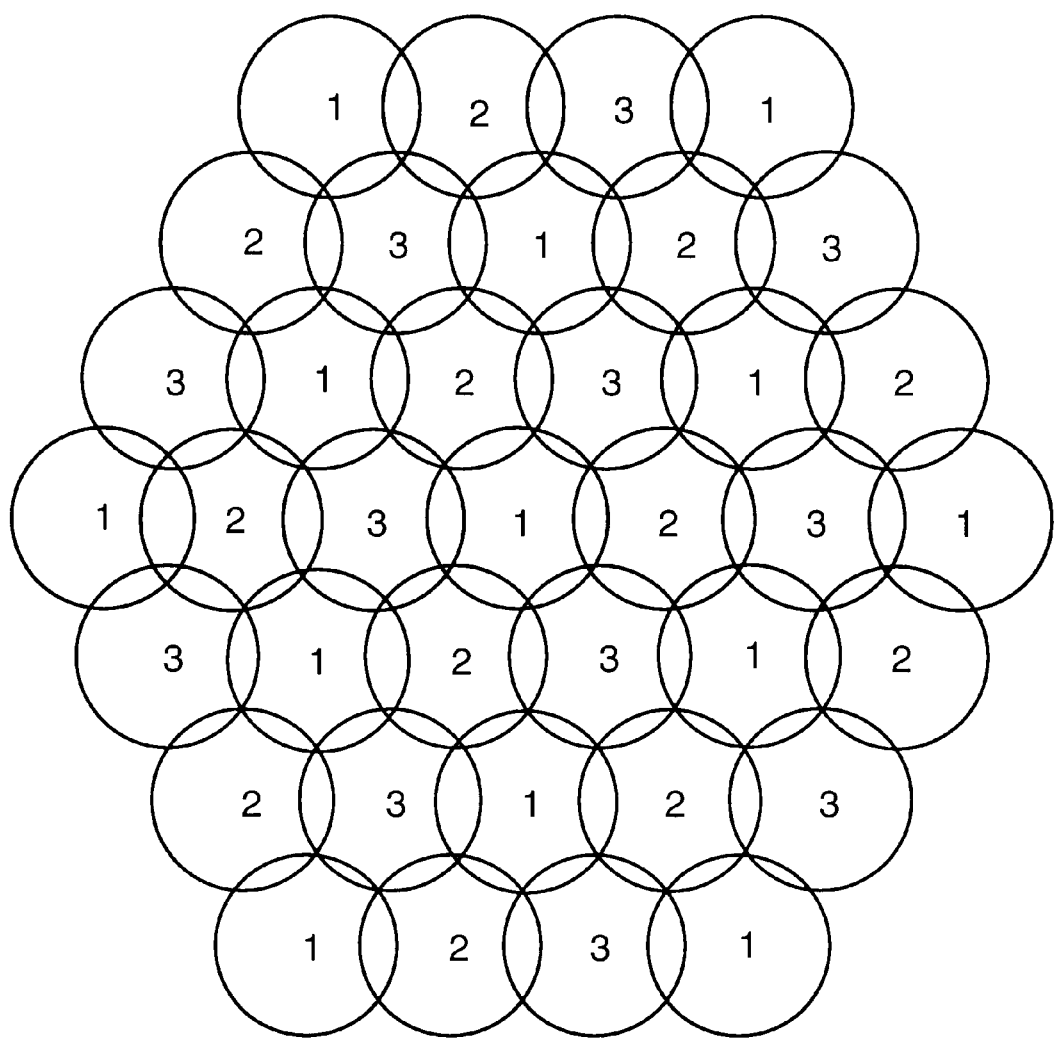
FIG. 6 illustrates a typical multibeam antenna, pattern with band segments assigned in a 1:3 frequency reuse pattern.

The present invention is further intended for a system that incorporates the improvement disclosed in U.S. patent y application Ser. No. 08/989,466 entitled "Increased Capacity in an OCDMA System by Frequency Isolation", to increase system capacity by providing frequency isolation between beams of a multibeam antenna. This is ordinarily implemented by splitting the available spectrum into $N_{ru}$ subbands and assigning the subbands to different beams in a $1:N_{ru}$ frequency reuse pattern. However, in the system disclosed here, the subcarriers are spaced across the full available spectrum at frequency intervals of $N_{ru}\chi R_c$ as shown in FIG. 4 for $N_{ru}=3$. Thus, $N_{ru}$ sets of disjoint subcarrier frequencies are available in FIG. 5, and can be assigned to beams in a $1:N_{ru}$ frequency reuse pattern such as shown in FIG. 6 for $N_{ru}=3$. Frequency isolation is maintained due to the orthogonal spacing of the subcarriers; however, the signal power is not yet spread uniformly.

Figure 7:
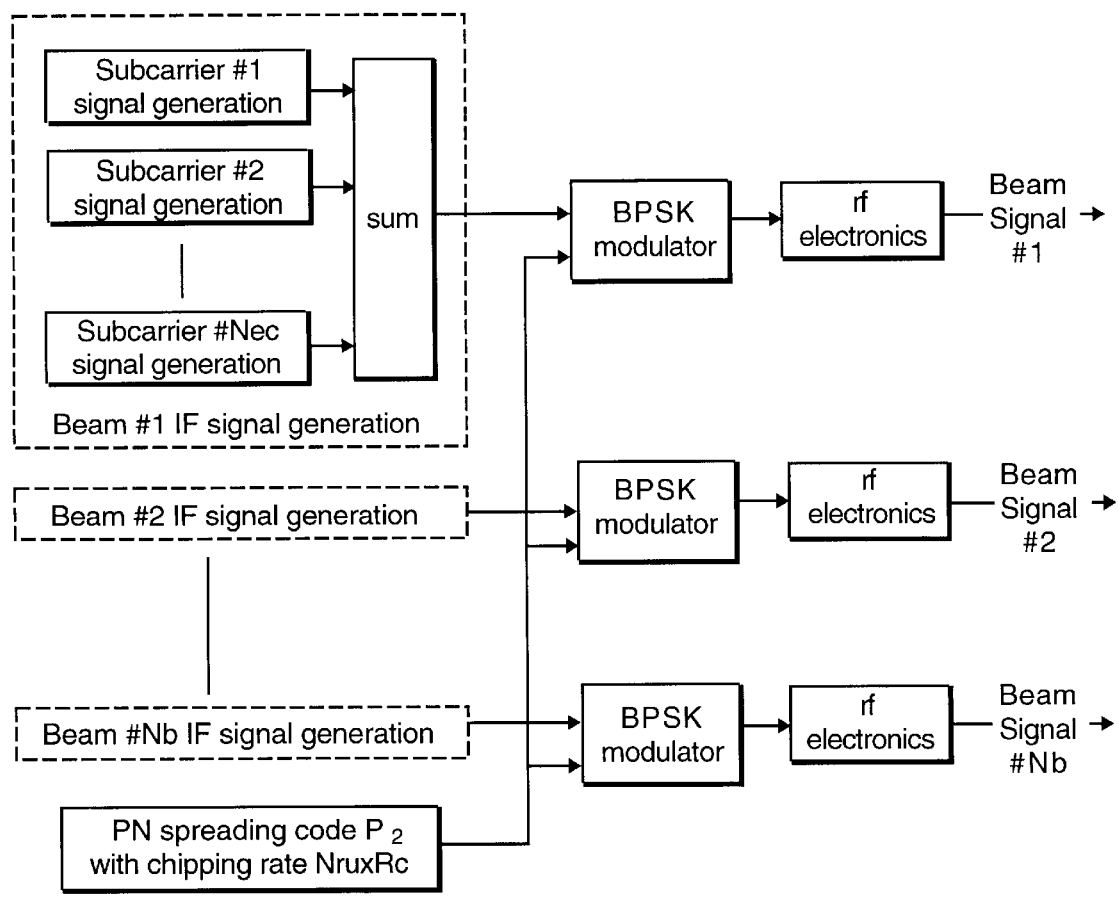
FIG. 7 is an illustrating of beam signals with spreading code $P_2$ applied with chipping rate of three times that of the orthogonal codes.
Figure 8A:
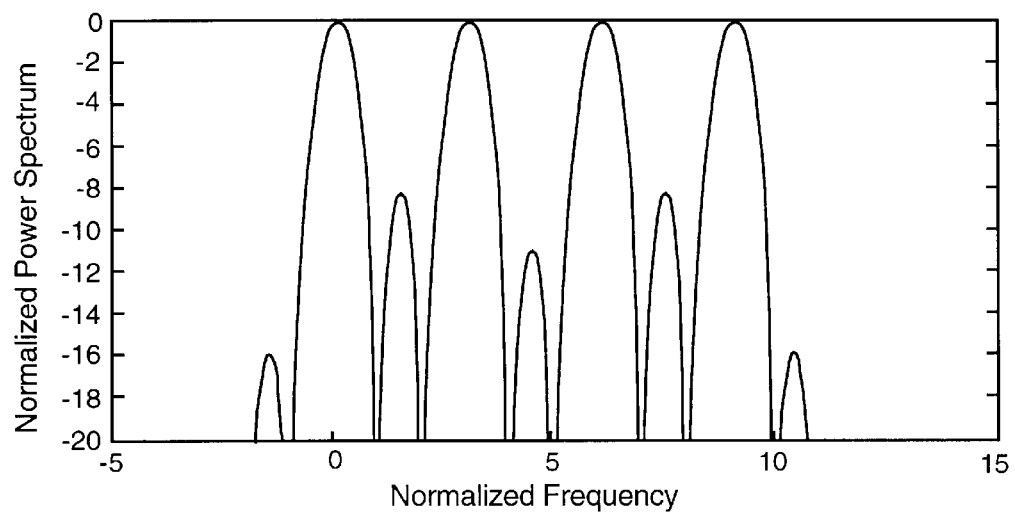
FIG. 8a is a graph showing the normalized power spectrum of beam signals before spreading with the PN code $P_2(N_{ru}=3)$.
Figure 8B:
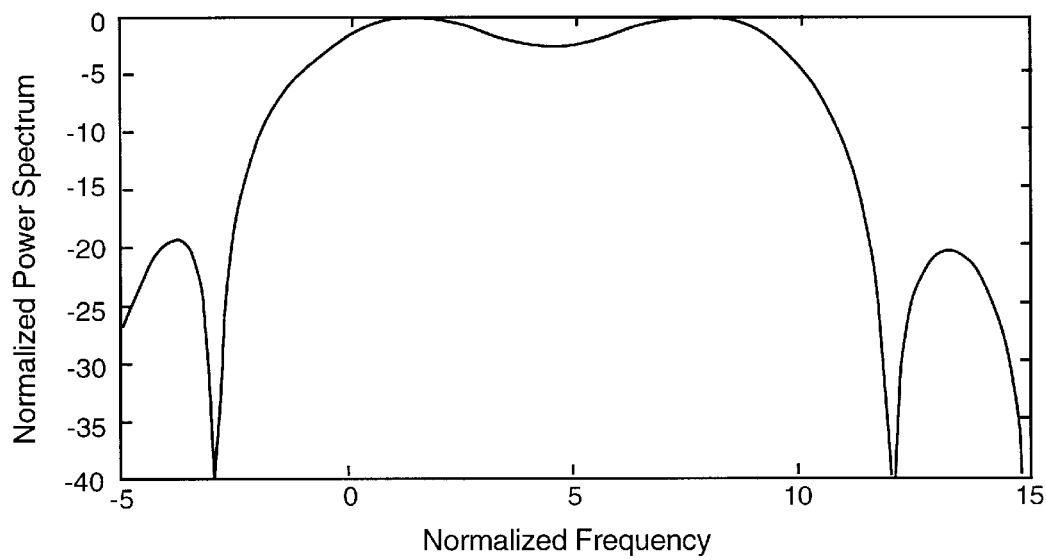
FIG. 8b is a graph of normalized power spectrum of beam signal after spreading with PN code $P_2$, clocked at three times the chipping rate of the orthogonal codes.

The FL signal is now modulated with a second PN sequence $P_2$, which has chipping rate equal to $N_{ru}$ times the chipping rate of the orthogonal sequences, as shown in FIG. 7. This sequence is identical in all beams and acts to spread the signal power uniformly as shown in FIGS. 8a and 8b.

The received FL signal is correlated with a synchronized replica of $P_2$ which effectively removes it from the incoming signals, i.e. the resultant signals can now be treated as though the PN code $P_2$ was never applied.

The adjacent beam signals are isolated from the in-beam signal by virtue of the orthogonal frequency spacing. Thus, the incorporating of this invention allows uniform spectral spreading of the FL signal, while maintaining frequency isolation between adjacent beams.

While the invention has been described in relation to preferred embodiments of the invention, it will be appreciated that other embodiments, adaptations and modifications of the invention will be apparent to those skilled in the art.

What is claimed is:

1. A spread spectrum CDMA communication system in which one or more receiver equipped base stations communicate with a multiplicity of receiver equipped subscriber terminals located in different beams of a multi-beam satellite relay system, the base station(s) transmits a signal for each beam which is comprised of a set of orthogonally spaced subcarriers, each of which is modulated by a set of orthogonal, or nearly orthogonal, functions which are overlaid with a pseudo-noise (PN) sequence forming a coded spreading sequence for an information signal, each orthogonal function of said set carriers data for a single user in said bean, a source of selected carrier signals and means to modulate said information signals onto said subcarriers to form a beam signal and said coded spreading sequence on said beam signal, and wherein the available frequency spectrum is divided into nonoverlapping or orthogonal frequency segments which are assigned to different beams in a $1:N_{ru}$ frequency reuse pattern and each subscriber terminal has a receiver with means to coherently demodulate the base station signal, the improvement comprising:

a circuit at said base station for applying a PN spreading code, P2, with chipping rate $N_{ru}\chi R_c$ to all of the beam signals simultaneously to spread the signal energy over a wider bandwidth in order to reduce the power spectral density in each beam, and a circuit in the receiver for correlating a received signal with a synchronized replica of P2 to remove P2 from the incoming signal without affecting beam-to-beam frequency isolation.

2. The system of claim 1 in which the subcarriers of the beam signal are orthogonally spaced across the available frequency spectrum with spacing $N_{ru}\chi R_c$ and $N_{ru}$ distinct sets of subcarrier frequencies are formed to be assigned in the $1:N_{ru}$ beam frequency reuse pattern.

3. The system of claim 1 in which the data intended for each user is voice data.

4. In a spread spectrum CDMA satellite communication system, in which more than one satellite illuminates the same region on the earth, and one or more receiver equipped base stations communicate with a multiplicity of receiver equipped subscriber terminals located in different beams of the multi-beam satellite relay system, and the base station(s) transmits a signal for each beam which is comprised of a set of orthogonally spaced subcarriers, each of which is modulated by a set of orthogonal, or nearly orthogonal, functions which are overlaid with a pseudo-noise (PN) sequence forming a coded spreading sequence for an information signal, each orthogonal function of said set carries data for a single user in said beam, a source of selected carrier signals and means to modulate said information signals onto said subcarriers to form a beam signal and said coded spreading sequence on said beam signal, and wherein the available frequency spectrum is divided into non-overlapping or orthogonal frequency segments which are assigned to different beams in a $1:N_{ru}$ frequency reuse pattern and each subscriber terminal has a receiver with means to coherently demodulate the base station signal, the improvement comprising:

a circuit at said base station for applying a PN spreading code, P3, with a chipping rate $N_{ru}\chi R_c$ simultaneously to spread the signal energy over a wider bandwidth in order to reduce the power spectral density in each beam and reduce interference from neighboring satellites, and a circuit in the receiver for correlating a received signal with a synchronized replica of P2 to remove P2 from the incoming signal without affecting beam-to-beam frequency isolation.

5. The system of claim 4 in which the subcarriers of the beam signal are orthogonally spaced across the available frequency spectrum with spacing $N_{ru}\chi R_c$ and $N_{ru}$ distinct sets of subcarrier frequencies are formed to be assigned in the $1:N_{ru}$ beam frequency reuse pattern.

6. The system of claim 4 in which the data intended for each user is voice data.

7. A spread spectrum CDMA satellite communication system, in which another satellite communication system illuminates the same region on the earth, and one or more receiver equipped base stations communicate with a multiplicity of receiver equipped subscriber terminals located in different beams of the multi-beam satellite relay system, and the base station(s) transmits a signal for each beam which is comprised of a set of orthogonally spaced subcarriers, each of which is modulated by a set of orthogonal, or nearly orthogonal, functions which are overlaid with a pseudo-noise (PN) sequence forming a coded spreading sequence for an information signal, each orthogonal function of said set carries data for a single user in said beam, a source of selected carrier signals and means to modulate said information signals onto said subcarriers to form a beam signal and said coded spreading sequence on said beam signal, and wherein the available frequency spectrum is divided into non-overlapping or orthogonal frequency segments which are assignee to different beams in a $1:N_{ru}$ frequency reuse pattern, and each subscriber terminal has a receiver with means to coherently demodulate the base station signal, the improvement comprising:

a circuit at said base station for applying a PN spreading code, P2, with chipping rate $N_{ru}\chi R_c$ to all of the beam signals simultaneously to spread the signal energy over a wider bandwidth in order to reduce the power spectral density in each beam, a circuit in the receiver for correlating a received signal with a synchronized replica of P2 to remove P2 from the incoming signal without affecting beam-to-beam frequency isolation.

8. The system of claim 7 in which the subcarriers of the beam signal are orthogonally spaced across the available frequency spectrum with spacing $N_{ru}\chi R_c$ and $N_{ru}$ distinct sets of subcarrier frequencies are formed to be assigned in the $1:N_{ru}$ beam frequency reuse pattern.

9. The system of claim 7 in which the data intended for each user is voice data.

10. In a spread spectrum CDMA satellite communication system, in which another satellite communication system illuminates the same region on the earth, and a multiplicity of receiver equipped subscriber terminals located in different beams of the multi-beam satellite relay system communicate with one or more receiver equipped base stations, and the subscriber terminals transmit a signal which is comprised of one of a set of orthogonally spaced subcarriers, which is modulated by one of a set of orthogonal, or nearly orthogonal, functions which are overlaid with a pseudo-noise (PN) sequence forming a coded spreading sequence for an information signal, the orthogonal function of said set carries data for transmission to the base station in said beam, a source of the selected subcarrier signal and means to modulate said information signal onto said subcarrier to form a return link signal and said coded spreading sequence on said return link signal, wherein the available frequency spectrum is divided into non-overlapping or orthogonal frequency segments which are assigned to different beams in a $1:N_{ru}$ frequency reuse pattern, each base station has a receiver(s) with means to coherently demodulate the subscriber terminal signal, the improvement comprising:

a PN spreading code, P2, with chipping rate $N_{ru}\chi R_c$ is applied to the subscriber terminal transmit signal to spread the signal energy over a wider bandwidth in order to reduce the transmit power spectral density, and a circuit in the base station receiver for correlating a received signal with a synchronized replica of P4 to remove P2 from the incoming signal without affecting beam-to-beam frequency isolation.

11. The system of claim 10 in which the subcarriers in a beam are orthogonally spaced across the available frequency spectrum with spacing $N_{ru}\chi R_c$ and $N_{ru}$ distinct sets of subcarrier frequencies are formed to be assigned in the $1:N_{ru}$ beam frequency reuse pattern.

12. The system of claim 10 in which the data intended for each user is voice data.

* * * * *

UNITED STATES PATENT AND TRADEMARK OFFICE
CERTIFICATE OF CORRECTION

PATENT NO. : 6,075,781
DATED : June 13, 2000
INVENTOR(S) : John Ohlson and Francis D. Natali It is certified that error appears in the above-identified patent and that said Letters Patent is hereby corrected as shown below:

On the title page, please make the following change to Setion [75] (Inventors), following "Francis D. Natali";
    Cancel "Pt. Townsend, Va." and substitute -- Pt. Townsend, Washington--.

Signed and Sealed this

Twenty-ninth Day of May, 2001

Attest:

NICHOLAS P. GODICI

*Attesting Officer*      *Acting Director of the United States Patent and Trademark Office*